US 9,296,048 B2

(12) United States Patent
Ihara et al.

(10) Patent No.: US 9,296,048 B2
(45) Date of Patent: Mar. 29, 2016

(54) CLAMP DEVICE OF A DRILL AND AIR DRIVE DRILL

(71) Applicant: SUGINO MACHINE LIMITED, Uozu-shi, Toyama (JP)

(72) Inventors: Minoru Ihara, Uozu (JP); Hideki Uchiuzo, Namerikawa (JP)

(73) Assignee: SUGINO MACHINE LIMITED, Toyama (JP)

( * ) Notice: Subject to any disclaimer, the term of this patent is extended or adjusted under 35 U.S.C. 154(b) by 465 days.

(21) Appl. No.: 13/666,191

(22) Filed: Nov. 1, 2012

(65) Prior Publication Data
US 2013/0108386 A1 May 2, 2013

(30) Foreign Application Priority Data

Nov. 2, 2011 (JP) .................................. 2011-241075

(51) Int. Cl.
B23B 45/04 (2006.01)
B23B 31/40 (2006.01)

(52) U.S. Cl.
CPC ............. *B23B 45/044* (2013.01); *B23B 31/402* (2013.01); *B23B 2270/027* (2013.01); *Y10T 408/557* (2015.01)

(58) Field of Classification Search
CPC ............ B23B 2215/04; B23B 2247/12; Y10T 408/557; Y10T 408/558; Y10T 408/56245; Y10T 408/6757
USPC ........................................ 408/79, 80, 97, 130
See application file for complete search history.

(56) References Cited

U.S. PATENT DOCUMENTS

| 2,935,905 A | | 5/1960 | Winslow |
| 3,663,115 A | | 5/1972 | Vindez et al. |
| 4,310,269 A | * | 1/1982 | Neu et al. ..................... 408/11 |
| 4,440,529 A | * | 4/1984 | Henslee et al. ............. 408/1 R |
| 4,453,868 A | * | 6/1984 | Winslow ..................... 408/138 |
| 5,062,746 A | | 11/1991 | Deremo |
| 5,482,411 A | | 1/1996 | McGlasson |
| 5,628,592 A | | 5/1997 | Ringer |
| 6,012,877 A | * | 1/2000 | McCowin ............... B23B 49/02 279/2.04 |

(Continued)

FOREIGN PATENT DOCUMENTS

| JP | 061059007 | 3/1986 |
| JP | 06027006 | 4/1994 |

(Continued)

OTHER PUBLICATIONS

Japanese Office Action for JP 2011-138973 (3 pages).

*Primary Examiner* — Sunil K Singh
*Assistant Examiner* — Alan Snyder
(74) *Attorney, Agent, or Firm* — Merchant & Gould P.C.

(57) ABSTRACT

A drive system can be simplified and downsized, improves its operability, and can be configured to clamp or unclamp a work at an accurate drive timing. This invention is a clamp device of a drill. This invention includes a clamp collet inserted into a hole formed in the work, a mandrels inserted slidably inside the clamp collet, a piston-cylinder mechanism reciprocating the mandrels axially, and a directional valve driving a piston. The directional valve includes a forward introduction port introducing a pressured fluid for advancing a ram of the drill, and a main introduction port introducing the main pressured fluid. When the pressured fluid is introduced to the forward introduction port, it is clamped by a one-way movement of the piston.

3 Claims, 6 Drawing Sheets

(56) References Cited

U.S. PATENT DOCUMENTS

| | | | |
|---|---|---|---|
| 7,344,341 B2 * | 3/2008 | Shemeta | 408/79 |
| 8,668,410 B1 | 3/2014 | Arana et al. | |
| 2004/0076484 A1 * | 4/2004 | Alam et al. | 408/79 |
| 2004/0101376 A1 | 5/2004 | Shemeta | |
| 2007/0248426 A1 | 10/2007 | Pettersson | |
| 2008/0145160 A1 | 6/2008 | Fritsche et al. | |

FOREIGN PATENT DOCUMENTS

| | | |
|---|---|---|
| JP | 2007092943 | 4/2007 |
| JP | 4162957 | 8/2008 |
| JP | 4374315 | 9/2009 |
| WO | 2004024376 A2 | 3/2004 |
| WO | 2010018340 | 2/2010 |

* cited by examiner

CLAMP DEVICE OF A DRILL AND AIR DRIVE DRILL

This application claims benefit of Serial No. 2011-241075, filed 2 Nov. 2011 in Japan and which application is incorporated herein by reference. To the extent appropriate, a claim of priority is made to the above disclosed application.

BACKGROUND OF THE INVENTION

1. Field of the Invention

The present invention relates to a clamp device of a drill. In particular, it relates to a clamp device of an air drive drill and an air drive drill equipped with the clamp device.

2. Background Art

In the device piercing a hole in a work, an art processing under stable condition of a position and a posture of processing by positioning and clamping the drill on the work has been well-known. (U.S. Pat. No. 3,663,115 (hereinafter, referred to as Patent Literature 1) and U.S. Pat. No. 5,062,746 (hereinafter, referred to as Patent Literature 2))

In Patent Literature 1, a drill for fixing the whole device on the work by operating a cam with a return spring and an air cylinder and enlarging or reducing in diameter of a head and a collet, has been already disclosed.

In Patent Literature 2, a device for fixing the whole device on the work, which a collet of a clamp mechanism enlarges or reduces in diameter under perpendicular pressure driven by a motor around the clamp mechanism connected to a drill unit, has been disclosed.

SUMMARY OF INVENTION

Problem to be Solved by the Invention

A drill described in Patent Literature 1 is, however, configured to operate a cam with a return spring and an air cylinder. Then, it has a problem that its operability is not good and chips are easily clogged up, on the ground that a configuration around a tip thereof becomes complicated and the device becomes to be large in size.

A drill described in Patent Literature 2 is, however, configured to drive a clamp mechanism by a motor and not to supervise and control a drive system of the clamp device and a drive system of the drill. Then, it has a problem that its operability is not good due to a complicated operability of the drill and the clamp device and its drive timing is hard to control due to a complicated mechanism.

The present invention has been made under such circumstances. Then, the present invention is configured to simplify the drive system and downsize their devices, such that the present invention is configured to control and supervise a drive system of the clamp device and a drive system of the drill. Thus, an object of the present invention is to provide a clamp device of the drill possible for clamping or unclamping at an accurate drive timing and an air drive drill equipped with the clamp device due to an improved operability.

Means for Solving the Above Problems

In order to solve the above problems, an invention according to Claim 1 of the present invention is a clamp device of a drill clamped on a work with the drill equipped with in place. The present invention comprises a clamp collet inserted into a hole formed in the work to clamp the work, a mandrels inserted slidably inside the clamp collet, a piston-cylinder mechanism reciprocating the mandrels axially to the clamp collet, and a directional valve supplying the piston-cylinder mechanism with the pressured fluid to drive the piston. Furthermore, the directional valve includes a forward introduction port introducing a pressured fluid for advancing a ram of the drill, and a main introduction port introducing the main pressured fluid, in order to support the piston-cylinder mechanism with the main pressured fluid to clamp caused by one-way movement of the piston, when the pressured fluid is introduced to the forward introduction port.

The present invention is configured to clamp the clamp device on a work, in case where the pressured fluid for advancing is introduced to the directional valve. Then, it can clamp the drill on the work in conjunction with a forward movement of a ram of the drill.

In such a way, the present invention is configured to control by a linkage between a drive system of the claiming device and a drive system of the drill. Thus, it improves its operability by simplification and downsizing of the drive system and is able to clamp at an accurate drive timing.

In an invention according to Claim 2, the directional valve comprises an unclamp button supplying the piston-cylinder mechanism with the main pressured fluid to become to be unclamped by moving the piston to the other direction.

In such a configuration, the clamp device according to the present invention is configured to be equipped with an unclamp button. Then, it is configured to control a linkage between a drive system of the clamp device and a drive system of the drill. Then, it improves the simplification and downsizing of the drive system, and it improves its operability.

In an invention according to Claim 3, a clamp device of a drill further comprises a slide base supporting the clamp device, and a slide support mechanism connected to the drill to support the slide base movably toward a direction extending along a surface of the work relative to the drill. Furthermore, the slide support mechanism includes a guide bar supporting the slide base movably along a surface of the work with one end thereof connected to the drill and with the other end thereof connected to an adjustment block supported in contact with a surface of the work, and a height adjustment mechanism adjusting a height on the work of the adjustment block.

In the above configuration, the clamp device according to the present invention is configured to provide the slide support mechanism supporting movably toward a direction extending along a surface of the work. Then, it is easy to make a positioning between a drilled hole formed in the work and the drill. Then, the drill can be exactly clamped on the work.

In an invention according to Claim 4, an air drive drill comprises the clamp device described in any one of Claims 1 to 3, in which the drill is an air drive drill and the pressured fluid driving the piston is compression air, a body shaping in the form of a cylinder, a ram housed advancingly and retractably inside a body, a spindle air motor housed in the ram to rotate a drill, a forward duct advancing the ram and circulating the forward pressured fluid, and an air supply port supplying the compression air through the air duct to the forward duct and the spindle air motor.

In the above configuration, the drill according to the present invention is considered as an air drive drill driving a spindle by air. The drive system of the clamp device and the drive system of the drill can be interrelatedly controlled between the drive system of the clamp device and the drive system of the drill by driving the clamp device by the compression air. Thus, it simplifies and downsizes the drive system, and improves its operability. It can also provide an air drive drill equipped with the clamp device being capable of clamping and unclamping at an accurate drive timing.

Effect of the Invention

The present invention is designed to supervise and control a drive system of the clamp device and a drive system of the drill. Then, it can provide the clamp device of the drill, which simplifies and downsizes the device system, improves its operability, and clamps or unclamps at an accurate drive timing, and an air drive drill equipped with the clamp device.

EMBODIMENTS FOR CARRYING OUT THE INVENTION

An air drive drill 100 equipped with a clamp device 1 according to an embodiment of the present invention will be described in detail with reference to drawings.

Figure 1:
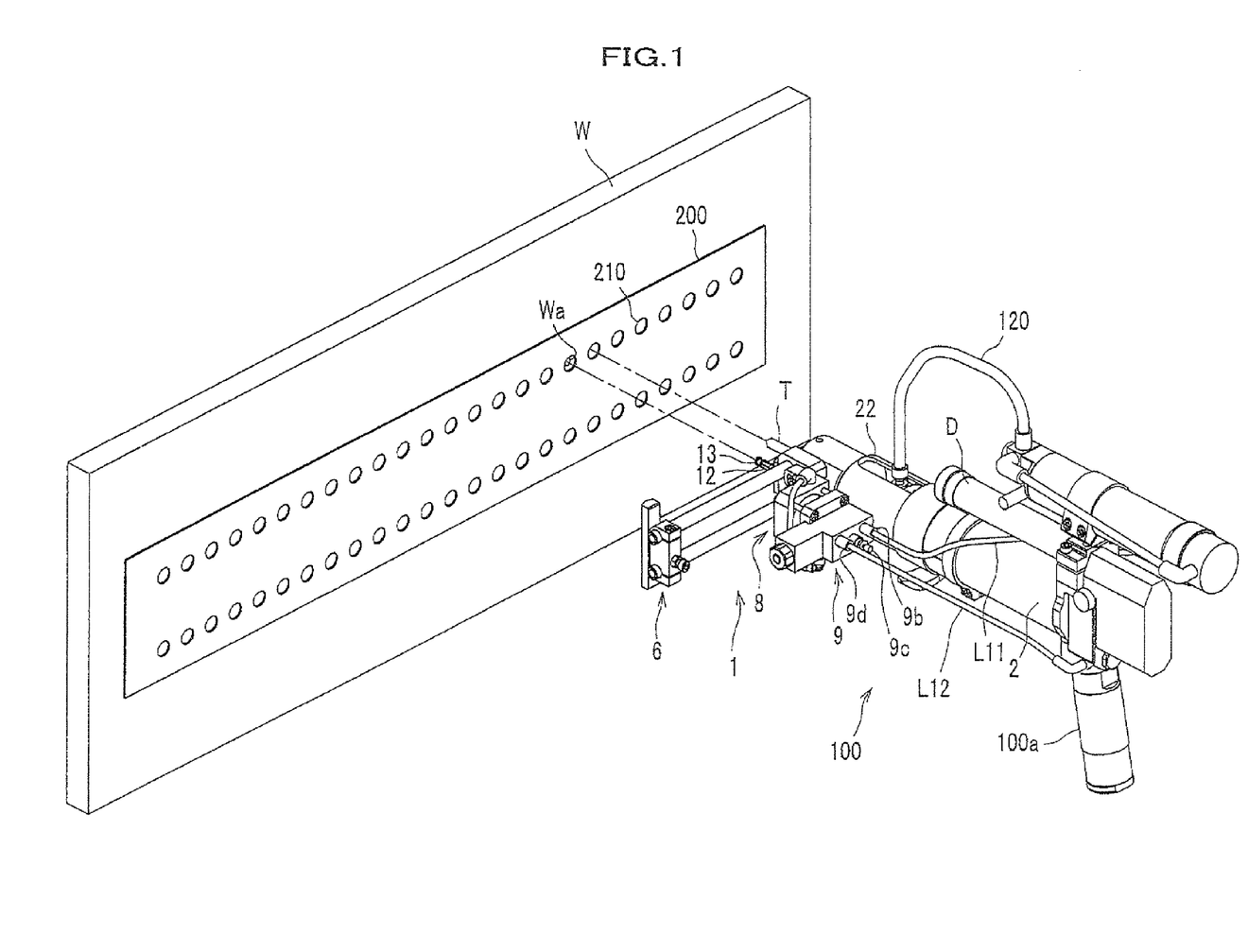
FIG. 1 is a perspective view showing a use of an air drive drill equipped with the clamp device according to an embodiment of the present invention.

As shown in FIG. 1, the air drive drill 100 is a hand tool, by which a worker (as not shown) is designed to insert a tip 110 (See FIG. 2) of the air drive drill 100 into a guide hole 210 provided in a template 200 with the grip 100a held, and pierce a hole with the air drive drill 100 fixed on a work W by the clamp device 1.

In FIG. 1, a drill T is a working tool for piercing a hole. The clamp device 1 is configured to clamp the air drive drill 100 on the work W by expanding in diameter a clamp collet as later described, after the clamp collet is reduced in diameter and inserted into the drilled hole Wa as already processed.

Figure 2:
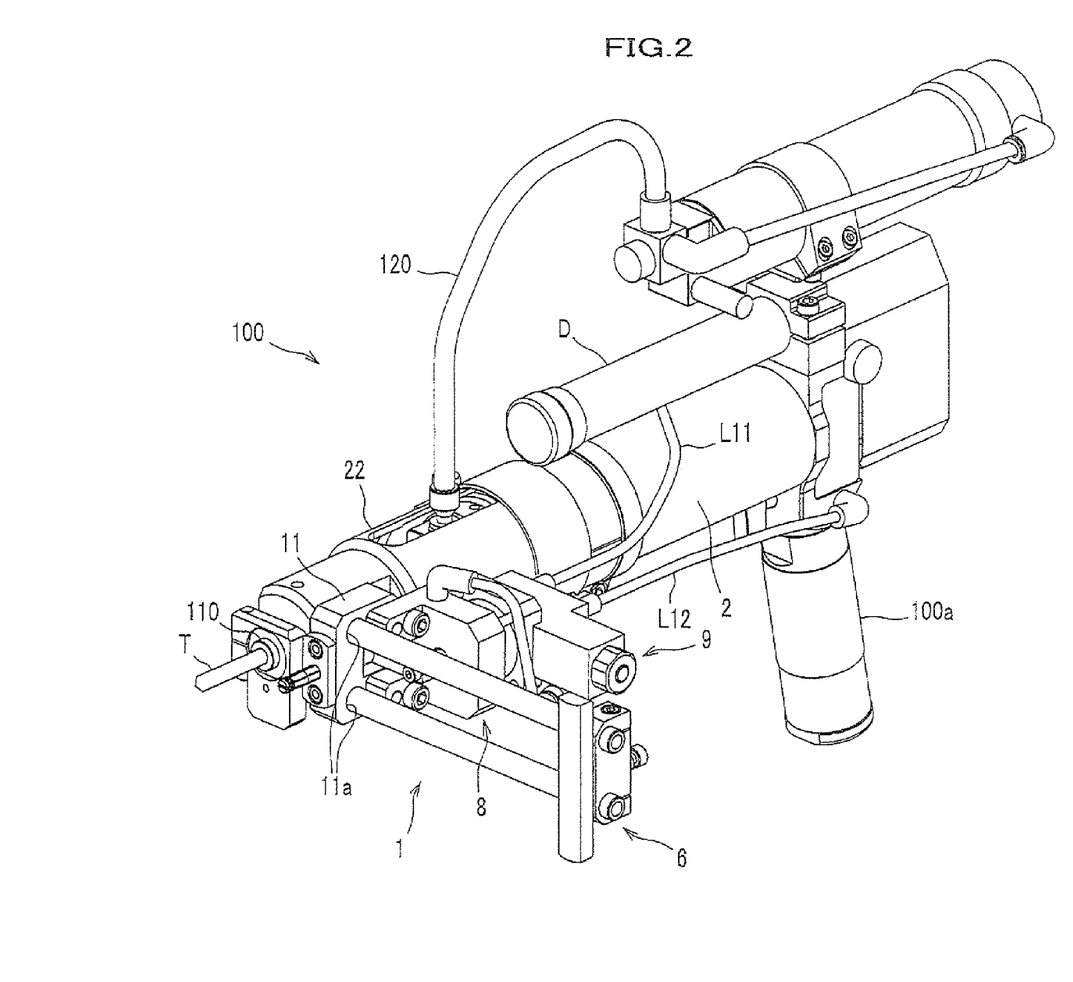
FIG. 2 is a perspective view seen from front and upper right side showing a whole configuration of the air drive drill equipped with the clamp device according to an embodiment of the present invention.
Figure 3:
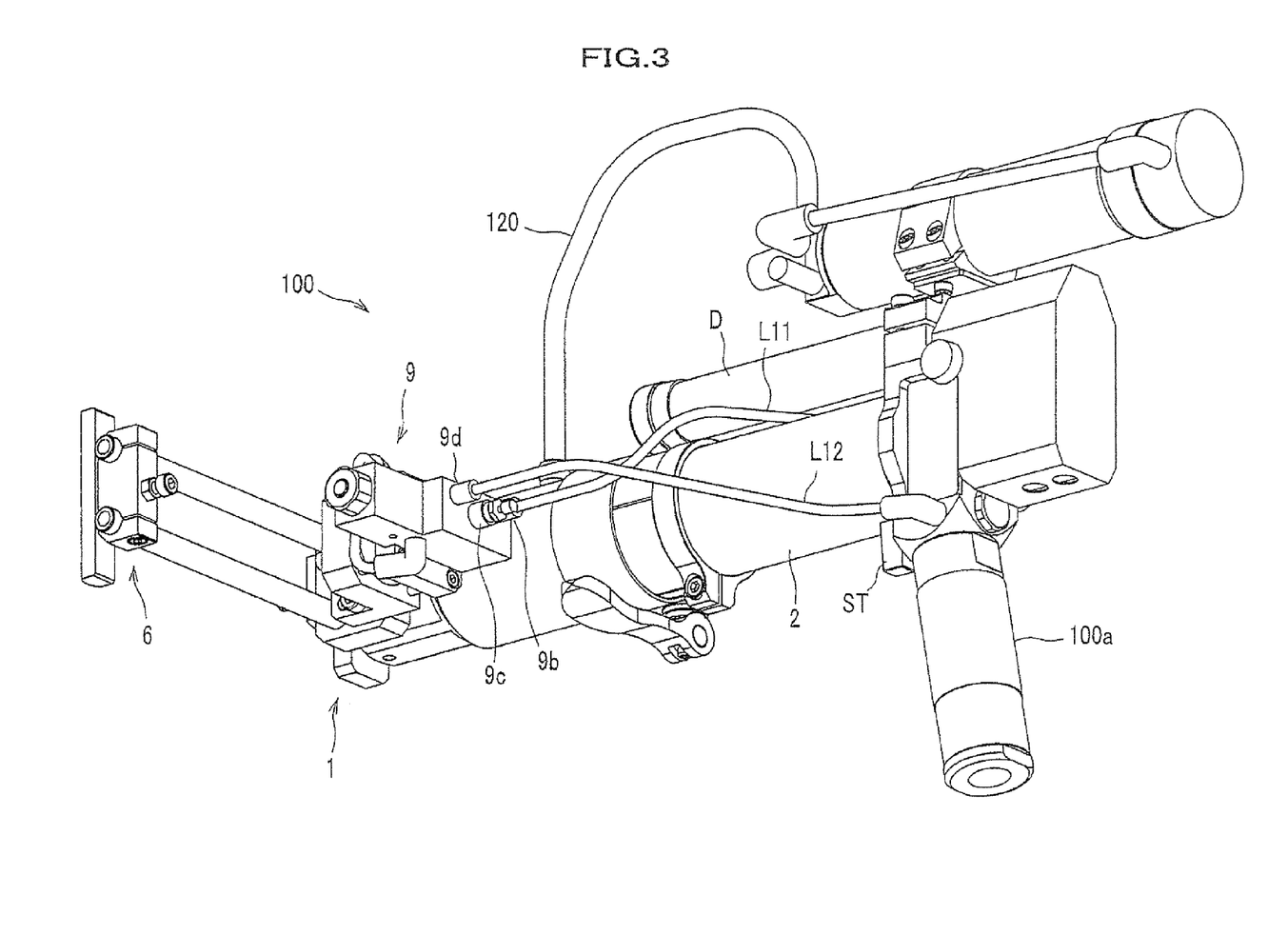
FIG. 3 is a perspective view seen from rear and lower left side showing a whole configuration of the air drive drill equipped with the clamp device according to an embodiment of the present invention.

As shown in FIG. 2, the air drive drill 100 is provided with a mist air supply pipe 120 supplying a work with a mist air from a blade's edge of the drill T (See FIG. 1) and a hydraulic damper D regulating a feed speed at the time of cutting. The air drive drill 100 is designed to pierce a hole, supplying the work with the mist air, and exhaust, recovering chips produced by piercing with use of a dust-collection pipe. Thus, the drilled holes can be preferably obtained.

For convenience of explanation, a condition held by a worker is considered as a standard in the air drive drill 100 according to an embodiment of the present invention. Therein, a side equipped with the drill T is considered as a front side (a tip side) and its opposite side is considered as a rear side. Further, a side as the grip 100a is mounted is considered as a lower side and its opposite side is considered as an upper side.

<Air Drive Drill>

Figure 4:
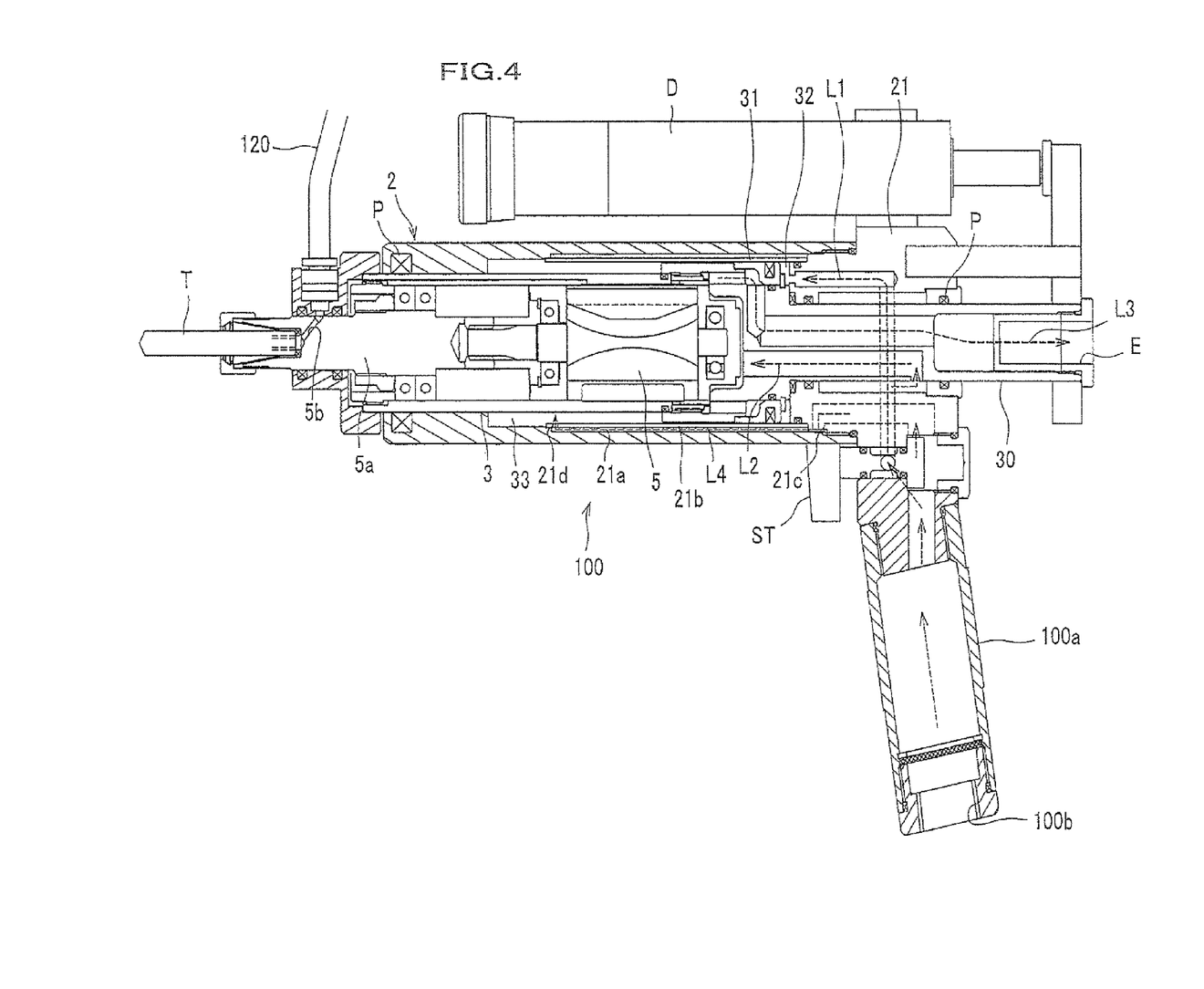
FIG. 4 is a front sectional view showing a configuration of the air drive drill according to an embodiment of the present invention.

FIG. 4 is a sectional view explaining a configuration of the air drive drill 100, which is not equipped with the clamp device 1, and it shows a condition as a ram 3 is at a retreated position prior to initiating the process.

As shown in FIG. 4, the air drive drill 100 is provided with the ram 3 mounted advancingly and retractably inside a body 2, a center bar 30 extended in a rear side of the ram 3, a spindle air motor 5 rotating the drill T mounted inside the ram 3, a piston 31 for advancing and retracting the ram 3, a first cylinder room 32 formed in a rear side of the piston 31, a second cylinder room 33 for retracting the ram 3 formed in a front side of the piston 31, a forward duct L1 communicated to the first cylinder room 32, a duct for motor L2 for rotating the spindle air motor 5 and an exhaust duct L3, a rearward duct L4 communicated to the second cylinder room 33, and a main air supply port 100b for supplying each of the ducts L1 to L4 with compression air.

As shown in FIG. 4, the body 2 is provided with a housing 21 shaped in the form of a cylinder and combined by screwing to choke a rear side of the body 2 and a nosepiece 22 (See FIG. 2 as not shown in FIG. 4) arranged to cover the drill T in a front side of the body 2.

A crevice 21a as being the rearward duct L4 is circumferentially formed and a cylinder 21b is mounted to cover the crevice 21a inside an inner peripheral part of the body 2. A circulation aperture 21c communicated to the crevice 21a is formed in a rear edge of the cylinder 21b. A circulation aperture 21d communicated to the crevice 21a is formed in a front side of the cylinder 21b. The housing 21 is configured to form the forward duct L1 communicating between the main air supply port 100b and the first cylinder room 32 formed in a rear side of the body 2.

The ram 3 is configured to be shaped in the form of a cylinder and to be mounted reciprocatively inside the body 2. The center bar 30 is screwed in a rear end of the ram 3 to be integrally connected. A seal member P is provided at a predetermined position of gap among the body 2, the ram 3 and the center bar 30. Then, it is designed not to leak compression air outside.

The center bar 30 is shaped in the form of a stepped bar, of which a front part is expanded in diameter and a rear part is reduced in diameter. The front part of the center bar 30 is inserted into a rear edge of the ram 3 to extend for choking the rear edge of the ram 3. The center bar 30 is configured to be provided with a duct for motor L2 connected to the main air supply port 100b to drive the spindle air motor 5, an exhaust duct L3 for exhausting air supplied to the spindle air motor 5, and an exhaust port E.

The piston 31 is equipped with the center bar 30 such that an outer peripheral part thereof slides with the cylinder 21b in a rear side of a front expanded part of the center bar 30.

<First and Second Cylinder Room>

The first cylinder room 32 and the second cylinder room 33 are provided between an outer peripheral part of the ram 3 and an inner peripheral part of the body 2.

The first cylinder room 32 is a pressure room for advancing the ram 3. The first cylinder room 32 is supplied with compression air from the forward duct L1 provided in the housing 21.

The second cylinder room 33 is a pressure room for retracting the ram 3. The second cylinder room 33 is supplied with compression air from the rearward duct L4 provided in the body 2.

As shown in FIG. 4, the spindle air motor 5 is provided slightly rearwards from the central part inside the ram 3. The spindle air motor 5 is designed to rotate a spindle 5a by the compression air supplied from the duct for motor L2 and pierce a hole by the drill T equipped detachably with the spindle 5a.

The drill T is supplied with mist air from a mist air supply pipe 120. It is designed to supply the mist air from the mist air supply pipe 120 through a mist air supply port 5b and through a hole (as not shown) provided to a blade's edge of the drill T to a processing part.

<Clamping Device>

Figure 5:
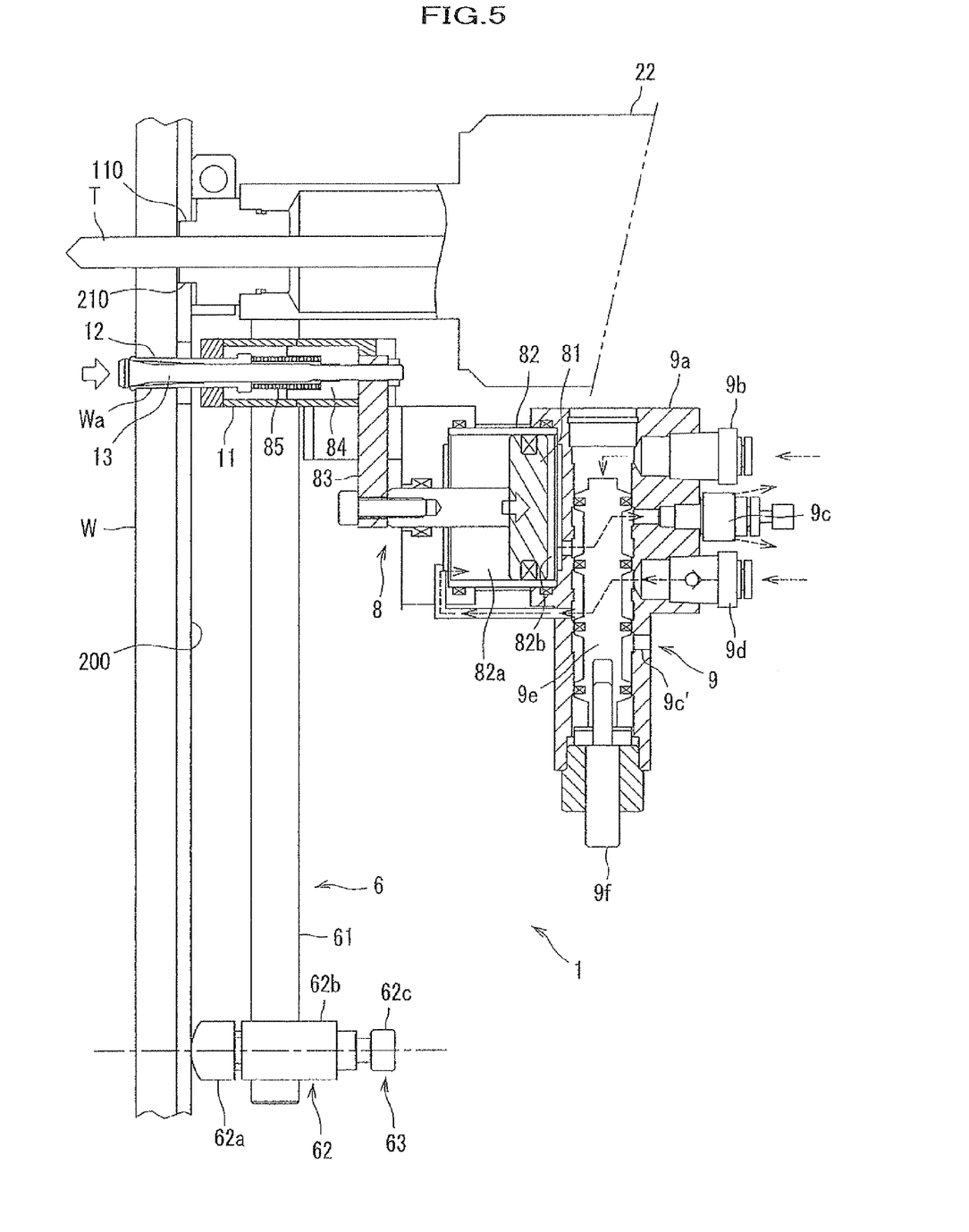
FIG. 5 is a plane sectional view of an essential part for explaining a configuration and a function of the clamp device according to an embodiment of the present invention and shows a condition at the time of clamping.
Figure 6:
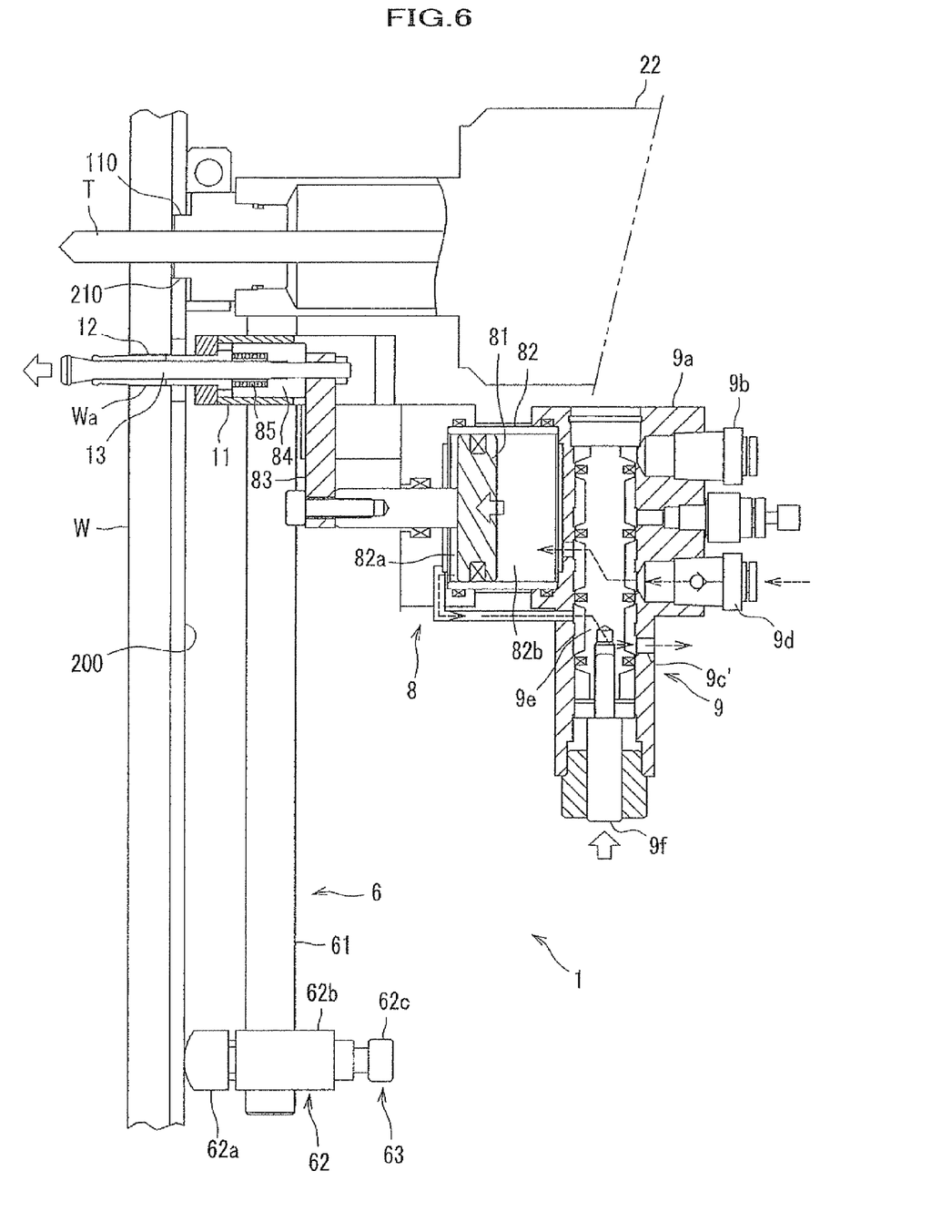
FIG. 6 is a plane sectional view of an essential part for explaining a configuration and a function of the clamp device according to an embodiment of the present invention and shows a condition at the time of unclamping.

Furthermore, the clamp device 1 of the air drive drill 100 according to an embodiment of the present invention will be described with reference to FIG. 5 and FIG. 6. FIG. 5 is a plane sectional view of an essential part for explaining a configuration of the clamp device 1 and shows a condition at the time of clamping. FIG. 6 shows a condition at the time of unclamping.

As shown in FIG. 5, the clamp device 1 is provided with a slide base 11 as being a base member, a slide support mechanism 6 supporting movably the slide base 11, a clamp collet 12 clamping the work W, a mandrels 13 providing slidably in the clamp collet 12, a piston-cylinder mechanism 8 reciprocating the mandrels 13, and a directional valve 9 supplying the piston-cylinder mechanism 8 with pressured fluid and driving a piston 81.

The slide base 11 is a member as being a base of the clamp device 1, and is movably supported in a direction extending along a surface of the work W by the slide support mechanism 6.

The slide base 11 is provided with a through hole 11a (See FIG. 2) for inserting a guide bar 61 configuring the slide support mechanism 6 at two positions thereof.

The slide support mechanism 6 is provided with the guide bar 61 for movably guiding the slide base 11, an adjustment block 62 connected to the guide bar 61, and a height adjustment mechanism 63 adjusting a height from the work W of the adjustment block 62.

The guide bar 61 is arranged in parallel to connect one end thereof to a tip of the nosepiece 22 of the air drive drill 100 and connect the other end thereof to the adjustment block 62 supported in contact with a surface of the work W. The guide bar 61 is arranged to slidably insert in a through hole 11a of the slide base 11 (See FIG. 2). Then, the guide bar 61 is designed to move the slide base 11 along a surface of the work W and get fine control over positioning at the time of inserting the mandrels 13 into a drilled hole Wa.

On the above configuration, the clamp device 1 is configured to support the slide base 11 movably along a surface of the work W. Then, a distance between the drill T equipped in the air drive drill 100 and the clamp collet 12 can be controlled at its option.

As shown in FIG. 5, the adjustment block 62 is provided with an adjustment plate 62a supporting in contact with the template 200 or the work W (See FIG. 1), an adjustment block 62b connected through a connecting pin, as not shown, to the adjustment plate 62a, and a height adjustment bolt 62c regulating a height of the adjustment block 62b.

The height adjustment mechanism 63 is a mechanism for moving the slide base 11 in parallel along a surface of the work W by regulating a height from the work W of the guide bar 61 penetrating into the adjustment block 62. The height adjustment mechanism 63 is also configured to regulate a height of the adjustment block 62b relative to the adjustment plate 62a by pushing or pulling the height adjustment bolt 62c.

The piston-cylinder mechanism 8 is provided with a piston 81, a cylinder 82 inserting the piston 81 slidably, a front pressure chamber 82a in the cylinder 82 supplied with the air for unclamping, and a rear pressure chamber 82b in the cylinder 82 supplied with the air for clamping.

The piston 81 is connected through a clamp bar 83 to the mandrels 13, and the clamp bar 83 is connected through a collet guide 84 to the clamp collet 12. The collet guide 84 is equipped with a clamp spring 85 expanding a tip thereof in diameter by urging the clamp collet 12 in a front direction on the mandrels 13.

The clamp collets 12 are configured to circumferentially arrange a plurality of linear slits (as not shown) extending along an axial direction. The clamp collet 12 is configured to clamp the air drive drill 100 on the work W by expanding in diameter, when the mandrels 13 as housed therein moves in a retractable direction. The clamp collet 12 is configured to unclamp the air drive drill 100 from the work W by reducing in diameter, when the mandrels 13 moves in an advancing direction. The clamp collet 12 is configured to set a thickness and a shape of slit to obtain an expanding diameter and a reducing diameter smoothly and stably.

On the above configuration, when the compression air is supplied to the front pressure chamber 82a, the mandrels 13 moves in a retracting direction inside the clamp collet 12 to expand the clamp collet 12 in diameter inside a drilled hole Wa of the work W. As a result, the air drive drill 100 is clamped on the work W. On the other hand, when the compression air is supplied to the rear pressure chamber 82b, the mandrels 13 moves in an advancing direction inside the clamp collet 12 to reduce the clamp collet 12 in diameter inside the clamp collet 12. As a result, the air drive drill 100 and the work W are unclamped each other.

The directional valve 9 is provided with a valve body 9a, an forward air introduction port 9b for supplying with air for advancing (See the forward duct L1 in FIG. 4), a first exhaust port 9c for exhausting air inside the rear pressure chamber 82b, a second exhaust port 9c' for exhausting air inside the front pressure chamber 82a, a main air introduction port 9d for supplying with main air, a valve 9e reciprocating inside the valve body 9a, and an unclamp button 9f.

Although it is not shown or illustrated in this embodiment, it is able to regulate a clamping force by providing a reducing valve regulating a pressure of main air supplied from the main air introduction port 9d. The regulation of the clamping force depending upon a quality of material can be prevented from damaging the work due to too much drawing force and deforming the work due to the work having a thin thickness.

The forward air introduction port is configured to be supplied from the duct L11 (See FIG. 1) bifurcating air for advancing flowing through the forward duct L1 from the forward duct L1, as shown in FIG. 4. The main air introduction port 9d is configured to be supplied from the duct L12 (See FIG. 1) by bifurcating main air supplied to the main air introduction port 100b as shown in FIG. 4. (See FIG. 1)

<At the Time of Clamp>

On the above configuration, as shown in FIG. 5, the directional valve 9 is configured to move downwards in FIG. 5 inside the valve body 9a, when air for advancing is introduced from the duct L11 (See FIG. 1) to the forward air introduction part 9b. Then, the main air supplied to the main air introduction port 9d is designed to clamp the air drive drill 100 supplied to the front pressure chamber 82a on the work W.

While the main air supplied to the main air introduction port 9d is supplied to the front pressure chamber 82a, the above clamp can be constantly maintained by the main air pressure.

On the other hand, as shown in FIG. 6, when a worker as not shown pushes an unclamp button 9f, the valve 9e is designed to move upwards in FIG. 5 inside the valve body 9a. Then, the compression air supplied from the forward air introduction port 9b is obstructed (or shut down) and the main air supplied to the main air introduction port 9d is supplied to the rear pressure chamber 82b. Thus, it results in a condition unclamping the air drive drill 100 from the work W.

A function of the air drive drill 100 according to the above embodiment will be explained with reference to FIG. 4 to FIG. 6.

As shown in FIG. 1, the air drive drill 100 according to this embodiment is configured to insert a tip 110 (See FIG. 2) of the air drive drill 100 into a guide hole 210 provided in the template 200 with a worker (as not shown) holding a grip 100a.

In this case, the worker (as not shown) is designed to move the slide base 11 by the slide support mechanism 6 in harmony with a pitch between the drilled holes Wa processed on the work W and arrange a distance between the drill T and the clamp collet 12.

As shown in FIG. 4, when a worker (as not shown) pushes a start button ST, the compression air supplied to the main air supply port 100b is configured to flow through the forward duct L1 and introduce to the first cylinder room 32. Then, the ram 3 starts moving.

In this case, the compression air flowing through the forward duct L1 is supplied through the duct L11 (See FIG. 1) bifurcated from the forward duct L1 to the forward air introduction port 9b of the directional valve 9. Then, the main air supplied to the main air introduction port 9d is supplied to the front pressure chamber 82a, and the air drive drill 100 is configured to clamp the work W with the template 200 sandwiched.

The mist air is jetted from a blade's edge of the drill T and the compression air is supplied from the duct for motor L2 to the spindle air motor 5. Then, the spindle air motor 5 results in rotating. The compression air rotating the spindle air motor 5 is configured to be exhausted from the exhaust port E through the exhaust duct L3.

A worker (as not shown) releases the start button ST, after the drill T penetrates the work W. Then, the air drive drill 100 is configured to flow the compression air from the main air support port 100b through the rearward duct L4 to the second cylinder chamber 33. Then, the ram 3 starts to retract. The air drive drill 100 is configured to retract the ram 3 and stop a jet of the mist air with the spindle 5a (FIG. 4) rotated, at the time of being clamped. When the ram 3 returns to a mechanical origin, the spindle 5a comes up to stop.

When the spindle 5a (FIG. 4) is stopped, a worker (as not shown) pushes an unclamp button 9f. Then, the air drive drill 100 is configured to move upwards the valve 9e in FIG. 5 inside the valve body 9a. As a result, the main air supplied to the main air introduction port 9d is supplied to the rear pressure chamber 82b to unclamp the air drive drill 100 and the work W.

As above mentioned, the air drive drill 100 according to this embodiment of the present invention is configured to clamp the clamp device 1 on the work W, when air for advancing is introduced to the directional valve 9. Then, the air drive drill 100 can be clamped on the work W by interlocking the ram 3 with an advancing movement.

In such a configuration, the drive system is supervised and controlled by an interlock between a drive system of the air drive drill 100 and a drive system of the clamp device 1. Then, the drive system can be simplified and downsized, improves its operability, and can be configured to clamp the work at an accurate drive timing.

Although an embodiment of the present invention has been described, it is not limited to the above-mentioned embodiment and its modification can be appropriately made.

For example, although the air drive drill 100 driven by the spindle air motor 5 has been used as a drill in this embodiment, it is not limited to this and a drill driven by a hydraulic control can be also used or applied.

EXPLANATION OF THE NUMERIC REFERENCE

| | |
|---|---|
| 1 | clamp device |
| 2 | body |
| 3 | ram |
| 5 | spindle air motor |
| 5a | spindle |
| 5b | mist air supply port |
| 6 | slide support mechanism |
| 8 | piston-cylinder mechanism |
| 9 | directional valve |
| 9a | valve body |
| 9b | forward air introduction port (forward introduction port) |
| 9c | first exhaust port |
| 9c' | second exhaust port |
| 9d | main air introduction port (main introduction port) |
| 9e | valve |
| 9f | unclamp button |
| 11 | slide base |
| 12 | clamp collet |
| 13 | mandrels |
| 31 | piston |
| 32 | first cylinder chamber |
| 33 | second cylinder chamber |
| 61 | guide bar |
| 62 | adjustment block |
| 63 | height adjustment block |
| 81 | piston |
| 82 | cylinder |
| 82a | front pressure chamber |
| 82b | rear pressure chamber |
| 83 | clamp bar |
| 84 | collet guide |
| 100 | air drive drill (drill) |
| 100a | grip |
| 100b | main air support port |
| 120 | mist air supply pipe |
| 200 | template |
| 210 | guide hole |
| L1 | forward duct |
| L2 | duct for motor |
| L3 | exhaust duct |
| L4 | rearward duct |
| T | drill |
| W | work |
| Wa | drilled hole |

What is claimed is:

1. An air drive drill unit, comprising:
   a drive unit driven by air comprising:
      a body having a form of a cylinder;
      a ram, which is housed inside the body so as to be capable of advancing and retracting;
      a spindle air motor housed inside the ram to rotate a drill;
      a forward duct; and
      an air supply port;
   a clamp device for clamping an air drive drill unit to a work, the clamp device including:
      a clamp collet to be inserted into a hole formed in the work to clamp the drive unit driven by air to the work;
      a mandrel inserted slidably inside the clamp collet;
      a clamp spring for urging the clamp collet in a forward direction relative to the mandrel to come into contact with a front end portion of the mandrel while expanding a front end portion of the clamp collet when the drive unit driven by air is clamped;

a piston-cylinder mechanism having a piston and a cylinder for reciprocating the mandrel axially relative to the clamp collet; and a directional valve to supply a main pressurized air of compressed air to the piston-cylinder mechanism to drive the piston, the directional valve having a forward introduction port for introducing a forward pressurized air of the compressed air for advancing the ram of the drive unit driven by air, and a main introduction port for introducing the main pressurized air, and the directional valve being configured so that the main pressurized air is supplied to the piston-cylinder mechanism to clamp the work by moving the piston in a first direction while a pressure of the main pressurized air acts on a surface on one side of the piston and air in the cylinder on the other side of the piston is discharged in the atmosphere, when the forward pressurized air is introduced to the forward introduction port;

wherein the forward duct is for flowing the forward pressurized air for advancing the ram; and wherein the air supply port is for supplying the compressed air through an air duct to the forward duct and the spindle air motor.

2. The air drive drill unit according to claim 1, wherein the directional valve comprises an unclamp button for supplying the piston-cylinder mechanism with the main pressurized air so as to move the piston in a second direction opposite the first direction to be unclamped while air in the cylinder on the first side of the piston is discharged in the atmosphere.

3. The air drive drill unit according to claim 1, wherein the clamp device further comprises:

a slide base for supporting the clamp device, and a slide support mechanism connected to the air drive drill unit to support the slide base movably in a direction extending along a surface of the work relative to the air drive drill unit, wherein the slide support mechanism includes:

a guide bar for supporting the slide base movably along the surface of the work, one end of the guide bar being connected to the air drive drill unit and the other end of the guide bar being connected to an adjustment block to be supported by coming into contact with the surface of the work, and a height adjustment mechanism for adjusting a height of the adjustment block relative to the surface of the work.

* * * * *